US006633982B1

United States Patent
Kurzeja

(10) Patent No.: US 6,633,982 B1
(45) Date of Patent: Oct. 14, 2003

(54) METHOD AND PROCESS FOR MANAGING ULTRA SECURE ELECTRONIC DISTRIBUTION OF DIGITAL MOVIES TO COMMERCIAL EXHIBITORS

(76) Inventor: Wayne Samuel Kurzeja, 6 Fox Hunt Rd., Barrington Hills, IL (US) 60010

( * ) Notice: Subject to any disclaimer, the term of this patent is extended or adjusted under 35 U.S.C. 154(b) by 0 days.

(21) Appl. No.: 09/272,990

(22) Filed: Mar. 20, 1999

(51) Int. Cl.[7] .......................... H04N 7/16; H04N 7/173; H04N 7/167
(52) U.S. Cl. ...................... 713/193; 380/209; 380/210; 380/211; 380/216; 380/221; 380/225; 380/237; 725/118; 725/148; 725/155; 348/465; 348/466
(58) Field of Search ................................ 380/225, 249, 380/210, 209, 205, 211, 221, 237, 216, 33, 34; 713/193; 725/118, 148, 153; 348/465, 466

(56) References Cited

U.S. PATENT DOCUMENTS

| 4,688,247 A | * | 8/1987 | Davidov ...................... 380/19 |
| 4,787,085 A | * | 11/1988 | Suto et al. ................... 370/110 |
| 4,866,770 A | * | 9/1989 | Seth-Smith et al. .......... 380/20 |
| 4,975,771 A | * | 12/1990 | Kassatly ...................... 358/146 |
| 4,994,909 A | * | 2/1991 | Graves et al. ................ 358/86 |
| 5,133,079 A | * | 7/1992 | Ballantyne et al. .......... 455/4.1 |
| 5,831,662 A | * | 11/1998 | Payton | |
| 5,924,013 A | | 7/1999 | Guido et al. | |
| 6,141,530 A | | 10/2000 | Rabowsky | |
| 6,262,776 B1 | * | 7/2001 | Griffit | |
| 6,377,690 B1 | * | 4/2002 | Witschorik .................. 380/268 |
| 6,456,824 B1 | * | 9/2002 | Butte et al. ................... 455/12.1 |

FOREIGN PATENT DOCUMENTS

| EP | WO 02 248 441 B1 | * | 12/1993 | ............ H04N/7/16 |
| GB | 2 222 057 A | * | 2/1990 | |

OTHER PUBLICATIONS

Dosch ch., EBU Technical Review, Digital broadcasting of studio—quality HDTV by satellite in tHE 21–GHZ frequency range an by coaxial cable networks, summer 1993, pp. 47–53.*
Matsushita Electronic Industrial Co, Ltd., "Matsushita crafts onE chip for audio/video". Electronic Engineering Times, Issue 115 p. 18, ISSN 01921541, Jan. 29, 2001.*
Silicon Image Inc., "First to Couple Digital Audio and Video on the DVI Link", PR Newswire, NAICS 334413, p. 1, Jan. 16, 2001.*
"Cylink and GTE Build ATM Crypto Security", Electron Commerce News, ISSN, 10862870, p. 1, Feb. 5, 1996.*

* cited by examiner

Primary Examiner—Gail Hayes
Assistant Examiner—Taghi T. Arani
(74) Attorney, Agent, or Firm—Sandra V Scavo, Esq.

(57) ABSTRACT

A method and system for managing electronic distribution of digital movies to commercial exhibitors at warp speed is made ultra secure by utilizing synchronized and concurrent digitally bifurcated data transmissions via both satellite up-links/downlinks and compressed digital data sent and retrieved from secure restrictive sites on the world wide web. All transmitted data received is interlocking and co-dependent upon each other for functional deciphered translation thereby considerably reducing the odds of piracy over present methods.

4 Claims, 3 Drawing Sheets

METHOD AND PROCESS FOR MANAGING ULTRA SECURE ELECTRONIC DISTRIBUTION OF DIGITAL MOVIES TO COMMERCIAL EXHIBITORS

CROSS-REFERENCE TO RELATED APPLICATIONS

N/A

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

1. Technical Field

The present invention relates to providing movie producers and digital movie exhibitors a quick, efficient, ultra-secure process for high quality digital movie distribution to commercial theaters.

2. Background Art

The method and process of distributing movies to commercial exhibitors has remained unchanged for almost 80 years. The reason this system has existed for so long rests primarily upon the fact that commercial movie distributors and exhibitors relied upon the same photographic technology unchanged since Thomas Edison's Kinetoscope. Movies are presently filmed onto celluloid photographic film stock and edited. The completed celluloid films are then distributed by reproducing thousands of copies of the edited celluloid film, placing the individual reels in heavy metal canisters and, under tight security, shipping the copies to the theaters for exhibition. The movies are then shown on a standard 35 mm commercial movie projector. Due to the size of commercial theater screens, no other process has even come close to the quality, sharpness and clarity of the image of the present celluloid projection system. Recently, however, several movie projectors have been developed using digital technology that has equaled or even surpassed the exhibition quality of the celluloid image on the large screen. These digital movie innovations have given way to ideas for innovative means of digital satellite movie distribution. The problem, however, is that many movie studios and producers do not wish to risk the millions of dollars it takes to produce the movie by transmitting the film on a satellite and inviting movie piracy. Several present encryption codes are already believed to have been broken. In all of the present encryption methods, the film is transmitted in its entirety as a type of puzzle waiting to be solved. Unfortunately, the rewards to movie pirates for solving such a puzzle are quite high while personal risks are low. The invention dramatically decreases a movie pirate's potential reward while substantially increasing the movie pirate's personal risk. First, if the pirate is successful in cracking the encryption code of the satellite feed, the best case scenario is possession of a fragmented soundless movie. If the enterprising pirate has the unlikely fortune to have also commandeered the Internet portion of the movie by breaking through the web security barriers and is additionally able to crack the second encryption code, the best case scenario for the thief is possession of two halves of a puzzle needing to be assembled.

BRIEF SUMMARY OF THE INVENTION

A system and process for ultra-secure distribution of digital movies by bifurcating selected elements of the movie before encryption, dispatching the individual bifurcated elements via separate and unrelated electronic vehicles, decoding and reconstructing bifurcated elements at the final intended destinations for use in commercial digital movie exhibition.

DETAILED DESCRIPTION OF THE INVENTION

Figure 1:
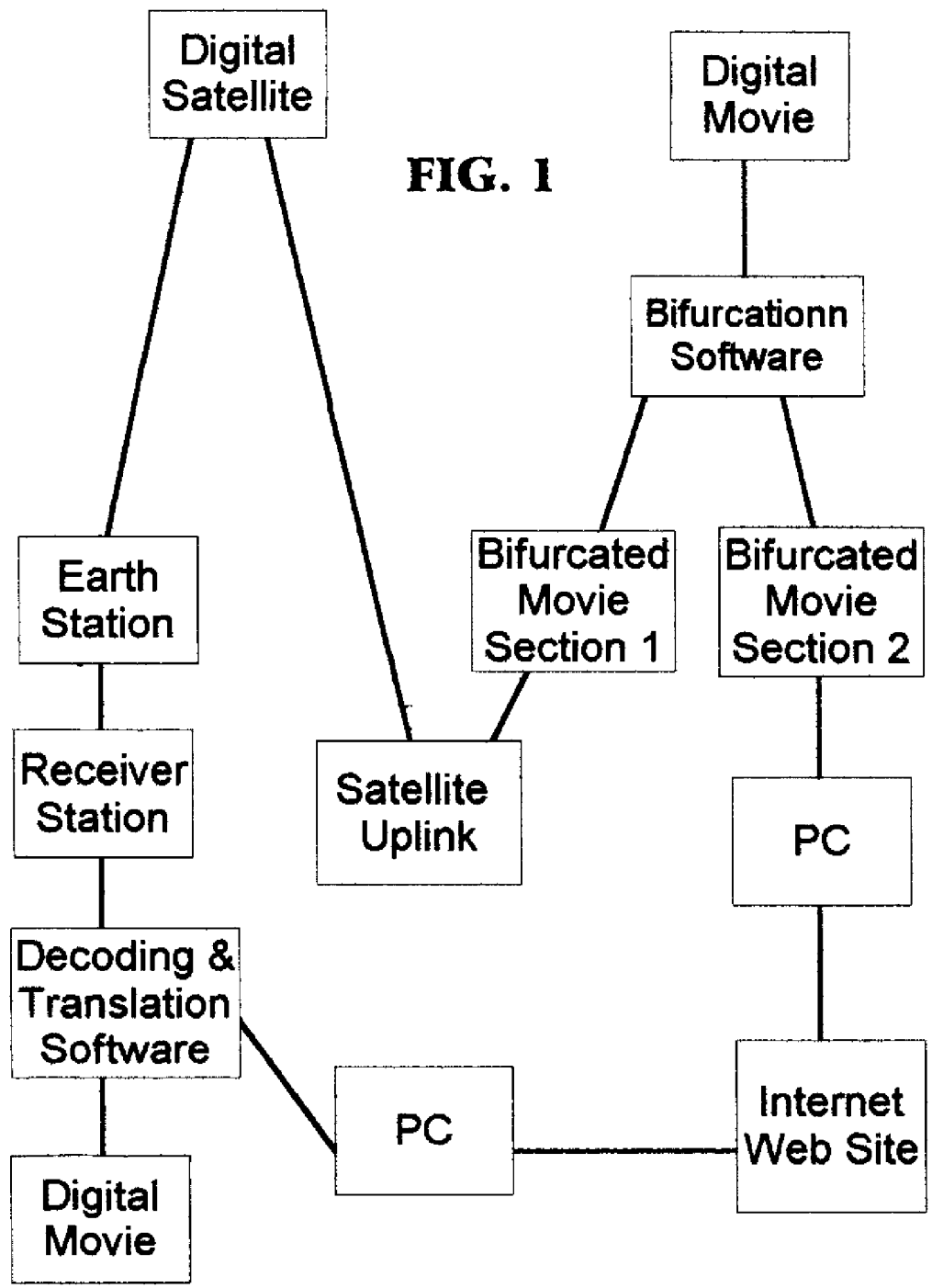
FIG. 1 is a diagram of the complete distribution process, showing the relationship, logistics and data flow of all elements in the bifurcation, encryption, transmission, retrieval, encryption translation and reconstruction procedure.
Figure 2:
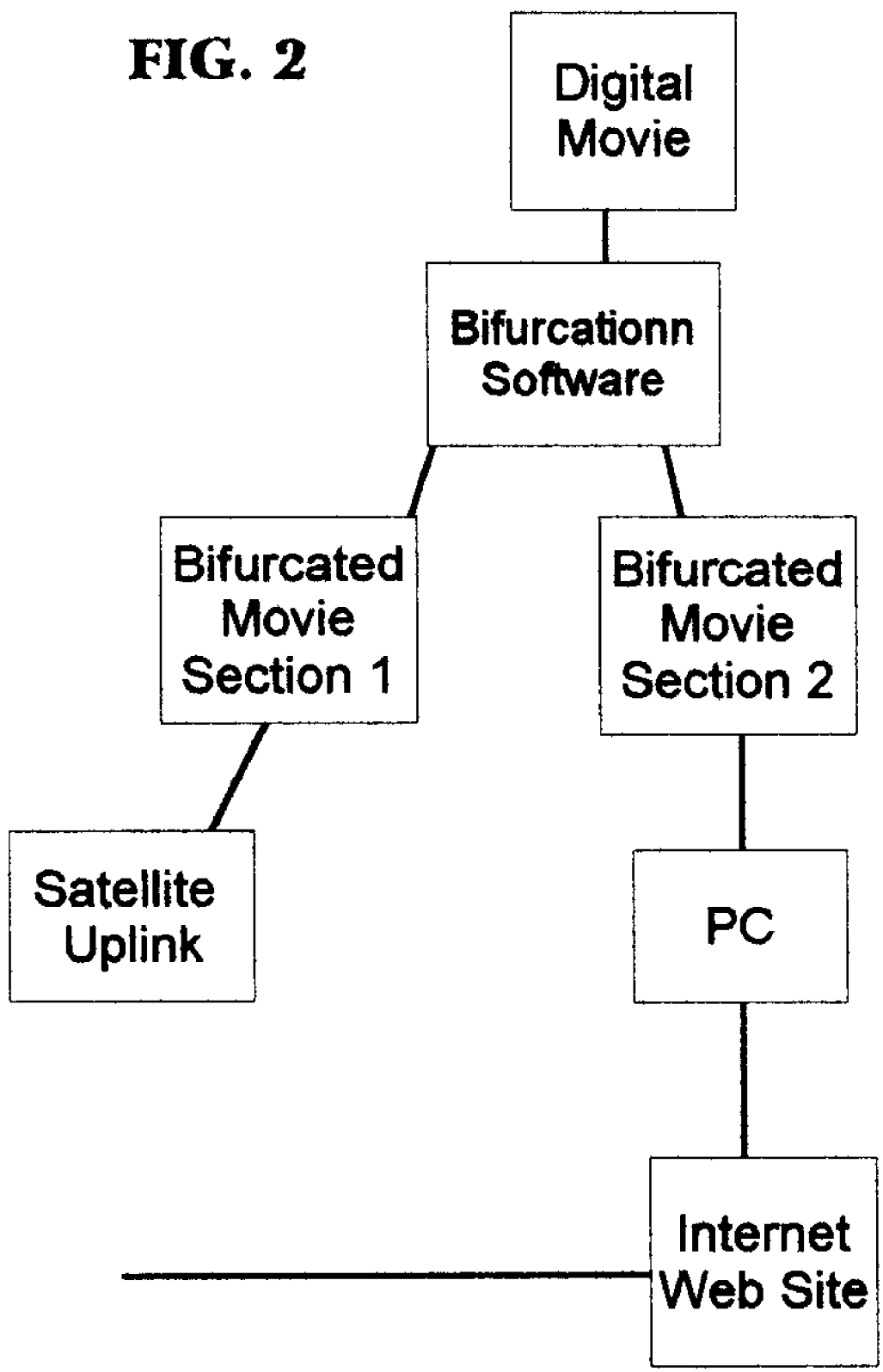
FIG. 2 is a diagram of the elements of the initial pre-transmission bifurcation and encryption process
Figure 3:
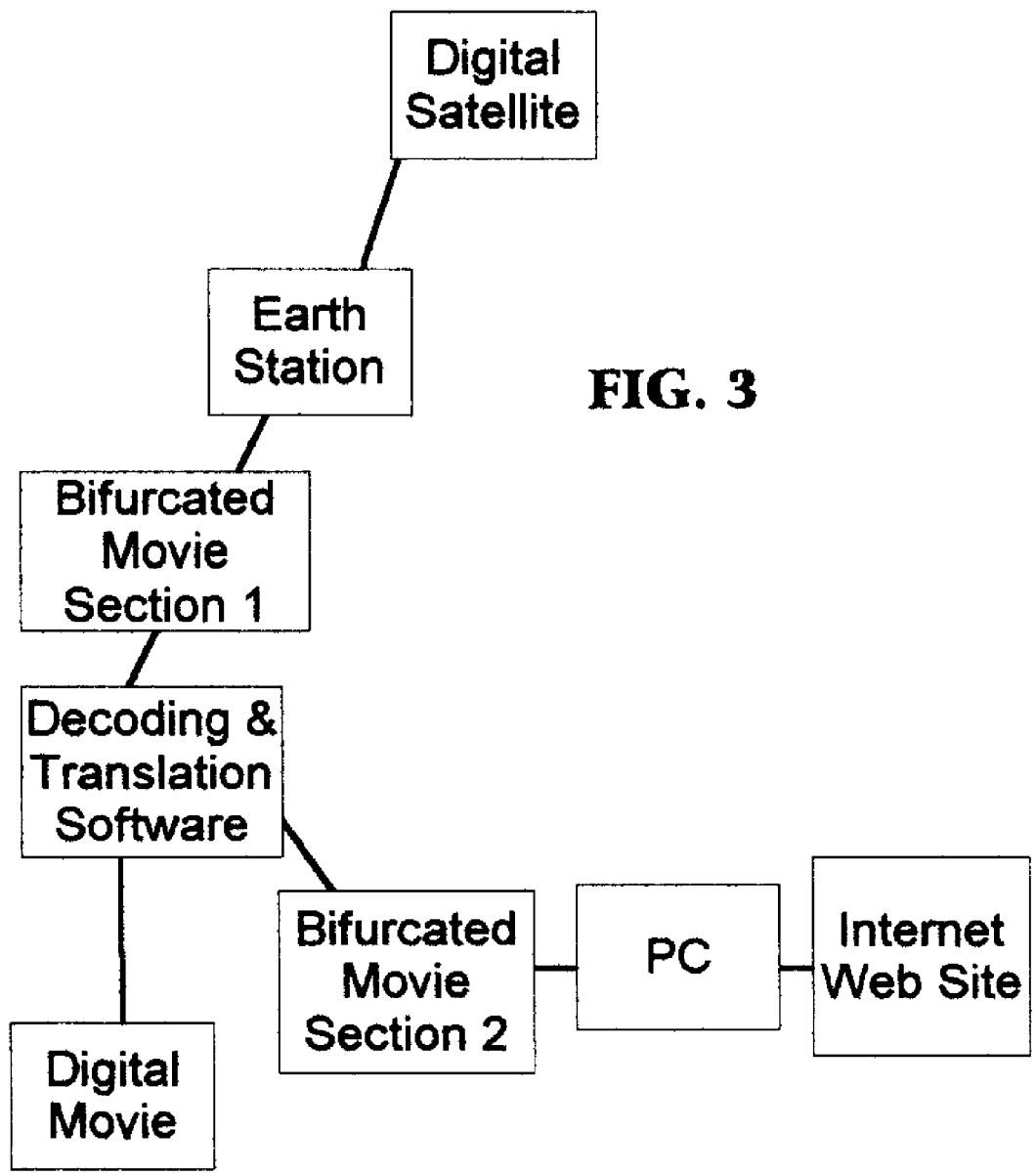
FIG. 3 is a diagram of the elements of the post-transmission decoding and reconstruction process

In FIG. 1, the diagram outlines the entire distribution process beginning with a digitized movie usually a Beta SP digital copy or DVD. Using a Pentium 450/120MB Windows NT computer, the specialized software at computer station one (FIG. 2) will separate certain elements from the movie before encryption and compression. Those elements best suited for transmission via the Internet (sound and several randomly selected elements of the movie) will be separated, then after encryption and compression, will be dispatched to a secure site on the world wide web (FIG. 2) with the remaining bifurcated elements of the movie encrypted and condensed for transmission via a digital satellite up-link (FIG. 3). The data from both synchronized concurrent transmissions (Internet and satellite) will then be processed at the receiver station two (FIG. 2) where, using a Pentium 450/120MB Windows NT computer, each bifurcated element will be decoded and the individual elements will be translated and using the specialized software, reassembled into complete full length film. Consequently, even if the scrambled satellite signal were pirated and the encryption code broken, the film would be virtually worthless without the missing elements and the offender's ability to transform those elements into a Beta SP Digital copy.

Other types of computers, digitization equipment, encryption and decoding devices (other than those disclosed above) may be used to effect a successful digital movie data transmission without departing from the spirit and scope of the invention. Similarly, other digital movie data acquisition systems, digital movie software or other data system sources may be used without departing from the spirit and scope of the present invention.

It will readily seem by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for distributing a digitized movie to a commercial theater, the method comprising:

(a) separating a digitized movie into first and second components;
(b) distributing the first component of the digitized movie to a commercial theater using a first distribution vehicle;
(c) distributing the second component of the digitized movie to the commercial theater using a second distribution vehicle different from the first distribution vehicle;
(d) reconstructing the digitized movie from the first and second components; and
(e) playing the reconstructed digitized movie at the commercial theater;
  wherein the first component comprises an audio component of the digitized movie, wherein the second component comprises a video component of the digitized movie, and wherein the first component additionally comprises some but not all of the video components of the digitized movie.

2. The method of claim 1, wherein said some but not all of the video components included in the first component are randomly selected.

3. A method for distributing a digitized movie to a commercial theater, the method comprising:

(a) separating a digitized movie into audio and video components;
(b) distributing the audio component of the digitized movie to a commercial theater using a first distribution vehicle;
(c) distributing the video component of the digitized movie to the commercial theater using a second distribution vehicle different from the first distribution vehicle;
(d) reconstructing the digitized movie from the audio and video components; and
(e) playing the reconstructed digitized movie at the commercial theater;
  wherein the method further comprises distributing some but not all of the video components of the digitized movie with the audio components using the first distribution vehicle.

4. The method of claim 3, wherein said some but not all of the video components that are distributed with the audio components using the first distribution vehicle are randomly selected.

* * * * *